(12) United States Patent
Otten

(10) Patent No.: US 12,491,857 B2
(45) Date of Patent: Dec. 9, 2025

(54) SUSPENSION SYSTEM WITH ELECTRONIC PITCH STABILITY CONTROL

(71) Applicant: FORD GLOBAL TECHNOLOGIES, LLC, Dearborn, MI (US)

(72) Inventor: Erik Otten, Victoria (AU)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 18/248,821

(22) PCT Filed: Oct. 19, 2020

(86) PCT No.: PCT/US2020/056304
§ 371 (c)(1),
(2) Date: Apr. 12, 2023

(87) PCT Pub. No.: WO2022/086487
PCT Pub. Date: Apr. 28, 2022

(65) Prior Publication Data
US 2023/0278539 A1   Sep. 7, 2023

(51) Int. Cl.
| B60W 30/18 | (2012.01) |
| B60W 10/184 | (2012.01) |
| B60W 30/04 | (2006.01) |
| B60W 50/00 | (2006.01) |

(52) U.S. Cl.
CPC .... B60W 10/184 (2013.01); B60W 30/18109 (2013.01); *B60W 2030/041* (2013.01); *B60W 2050/0005* (2013.01); *B60W 2050/0026* (2013.01); *B60W 2510/22* (2013.01); *B60W 2520/14* (2013.01); *B60W 2520/16* (2013.01); *B60W 2710/18* (2013.01)

(58) Field of Classification Search
CPC ......... B60W 10/184; B60W 30/18109; B60W 2030/041; B60W 2050/0005; B60W 2050/0026; B60W 2510/22; B60W 2520/14; B60W 2520/16; B60W 2710/18; B60T 17/22; F16D 51/22; F16D 65/09; F16D 2066/005; F16D 66/00
USPC .......................................................... 701/70
See application file for complete search history.

(56) References Cited

U.S. PATENT DOCUMENTS

| 4,468,050 A | 8/1984 | Woods et al. |
| 6,748,311 B1 * | 6/2004 | Walenty ................ B60W 10/06 701/79 |
| 2002/0189889 A1 | 12/2002 | Demerty |
| 2003/0130778 A1 | 7/2003 | Hrovat et al. |

(Continued)

FOREIGN PATENT DOCUMENTS

| JP | 5809506 B2 * | 11/2015 | ............ B60W 10/18 |
| JP | 2016517825 A * | 6/2016 | |

*Primary Examiner* — B M M Hannan
(74) *Attorney, Agent, or Firm* — Burr & Forman; Lorne Forsythe

(57) ABSTRACT

A vehicle control system includes a plurality of ride height sensors, a brake system and a controller. The ride height sensors may determine ride height information associated with individual wheels of a vehicle. The brake system may apply braking force to the individual wheels of the vehicle responsive to provision of a brake application signal. The controller may generate the brake application signal during vehicle pitch based on vehicle speed and the ride height information.

20 Claims, 6 Drawing Sheets

(56) References Cited

U.S. PATENT DOCUMENTS

| | | | |
|---|---|---|---|
| 2003/0200016 A1* | 10/2003 | Spillane | B60K 28/16 701/36 |
| 2008/0252025 A1* | 10/2008 | Plath | B60G 9/003 280/5.514 |
| 2009/0003168 A1* | 1/2009 | Yokoyama | G11B 5/59627 369/53.17 |
| 2009/0187324 A1* | 7/2009 | Lu | B60K 31/00 701/1 |
| 2010/0211277 A1 | 8/2010 | Craig et al. | |
| 2010/0211278 A1* | 8/2010 | Craig | B60T 8/1755 701/70 |
| 2011/0060478 A1 | 3/2011 | Nickolaou | |
| 2011/0166744 A1* | 7/2011 | Lu | B60T 8/1755 701/1 |
| 2015/0057885 A1 | 2/2015 | Brady et al. | |
| 2015/0217766 A1* | 8/2015 | Kelly | B60W 10/184 701/94 |
| 2015/0273972 A1* | 10/2015 | Plath | B60G 17/019 701/37 |
| 2016/0121862 A1* | 5/2016 | Richards | B60G 17/015 701/93 |
| 2017/0043778 A1* | 2/2017 | Kelly | B60W 30/143 |
| 2017/0203756 A1* | 7/2017 | Cotgrove | B60W 10/18 |
| 2018/0126981 A1* | 5/2018 | Gangwar | B60W 30/08 |
| 2019/0337523 A1* | 11/2019 | Rogness | G01G 19/08 |
| 2020/0198637 A1* | 6/2020 | Okubo | B60W 10/06 |
| 2020/0254995 A1* | 8/2020 | Lee | G01S 13/87 |
| 2020/0273435 A1* | 8/2020 | Shibata | G09G 5/38 |
| 2020/0346508 A1* | 11/2020 | Na | B62D 35/00 |
| 2021/0101434 A1* | 4/2021 | Sawarynski, Jr. | B60G 17/0152 |
| 2021/0380137 A1* | 12/2021 | Domeyer | G06V 20/56 |
| 2021/0394768 A1* | 12/2021 | Kim | B60W 30/18145 |

\* cited by examiner

SUSPENSION SYSTEM WITH ELECTRONIC PITCH STABILITY CONTROL

TECHNICAL FIELD

Example embodiments generally relate to vehicle suspension and, more particularly, relate to an electronically controlled suspension system that is capable of improving pitch stability for driving in environments with repetitive undulations by providing automatically generated braking interventions.

BACKGROUND

Vehicles commonly employ independent suspension that allows each wheel to move relative to the vehicle chassis independent of the other wheels. Meanwhile, a solid axle with panhard rods is another example of a common suspension design. The components and geometries used for suspension designs can vary to some degree. Within some suspension systems, shock absorbers (or simply "shocks") are provided, which are designed to provide damping for pitch (i.e., oscillation about a lateral axis of the vehicle). The shocks generally resist compression and rebound with damping forces that are applied over a range of travel of a piston rod.

Once a typical vehicle is designed and the damping components have been selected, the components operate passively to provide the damping for which they are designed. Some suspension systems may incorporate so called active suspension, which may change the firmness of shock absorbers based on different road conditions or physically raise or lower the chassis independently at each wheel. However, vehicle suspension technology remains an area of interest, particularly in relation to providing the ability to enable drivers to dynamically respond to different driving conditions and maintain high degrees of confidence and enjoyment of the driving experience.

BRIEF SUMMARY OF SOME EXAMPLES

In accordance with an example embodiment, a vehicle control system for improving pitch stability of a vehicle may be provided. The vehicle control system includes a plurality of ride height sensors, a brake system and a controller. The ride height sensors may determine ride height information associated with individual wheels of a vehicle. The brake system may apply braking force to the individual wheels of the vehicle responsive to provision of a brake application signal. The controller may generate the brake application signal during vehicle pitch based on vehicle speed and the ride height information.

In another example embodiment, a method of automatically applying electronic pitch stability control for a suspension system may be provided. The method may include determining pitch characteristics of a vehicle for a terrain profile and speed range via model data associated with the vehicle and receiving ride height information from a plurality of ride height sensors associated with respective individual wheels of the vehicle. The method may further include determining, based on the ride height information, vehicle speed and the model data, whether to generate a brake application signal, and applying braking forces to selected ones of the respective individual wheels of the vehicle responsive to generation of the brake application signal.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
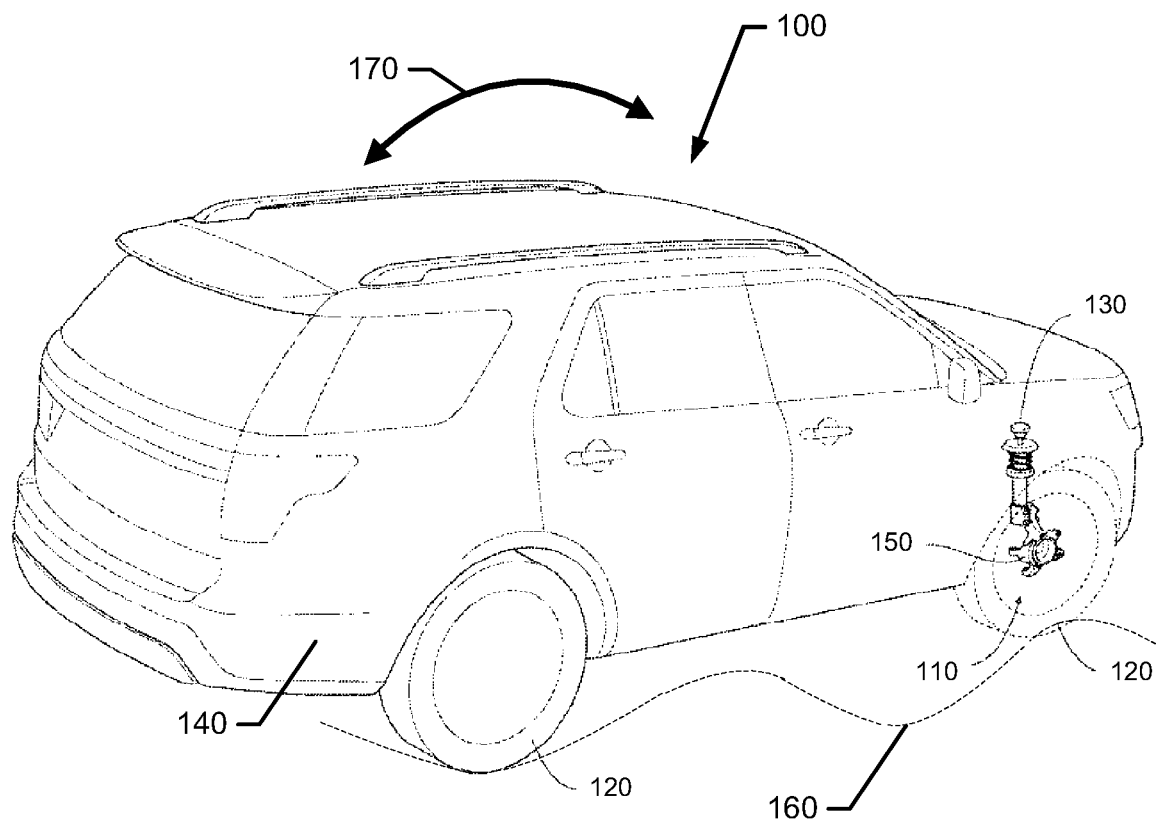
FIG. 1 illustrates a perspective view of a vehicle encountering undulating terrain and certain components of a suspension system of the vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Repetitive sets of relatively large undulations (sometimes referred to as "whoops") can cyclically put shock absorbers or dampers into the ranges in which damping forces being cyclically applied may provide a form of feedback or excitation into the system that can build to the point of resonance at certain speeds. This can create a speed, or even a range of speeds, at which pitch resonance may be approached for transit over whoops. Operators will tend respond to any experience that tends toward pitch resonance by manually reducing speed dramatically until its effects cannot be felt. However, example embodiments may provide a degree of electronic pitch stability control that may obviate any need for drivers to manually take action to avoid pitch resonance (e.g., by manually inserting brake interventions). Second order pitch resonance may also occur at double the speed at which pitch resonance occurs, and therefore may have similar effects. In this regard, at second order pitch resonance, the wheel may not have contact with the road so the tire cannot transfer any load into the suspension for that period of time. For purposes of this disclosure the term "pitch resonance" should be understood to refer to both first and second order pitch resonance.

Some example embodiments described herein may provide an improved suspension system that employs a control system that is capable of automatically taking action that avoids pitch resonance. By avoiding pitch resonance, contact between the wheels and the ground can be increased in even the most challenging of contexts, such as riding over whoops. As a result, vehicle performance and driver satisfaction may also be improved.

FIG. 1 illustrates a perspective of a vehicle 100 employing a suspension system 110 of an example embodiment. The suspension system 110 includes a plurality of wheels 120 in contact with the ground, and a damper 130 (e.g., a shock absorber or shock) disposed between each one of the wheels 120 and a body 140 or chassis of the vehicle 100. In some cases, the wheel 120 may be operably coupled to the damper 130 via a steering knuckle 150. Additional links may also be provided between the chassis and the steering knuckle 150 to stabilize the wheel 120, but such links are outside the scope of example embodiments.

As shown in FIG. 1, undulating terrain 160 (or whoops) that is repetitive in nature may be encountered by the vehicle 100. The body 140 of the vehicle 100 may tend to move up and down pitching cyclically as shown by double arrow 170 as the undulating terrain 160 is traversed. The pitching may correspondingly cause cyclic compression and extension of the damper 130 of the suspension system 110, as the damper 130 attempts to dampen out the motion. Because the damper 130 necessarily has a limited amount of linear travel for the piston rod therein, a certain degree of harshness could be encountered when the limit is reached at either end. To reduce this harshness, and provide a smoother ride for passengers, the damper 130 may provide additional hydraulic force near the respective limits. The additional hydraulic force may, however, provide positive feedback into the system. At certain speeds, as noted above, the positive feedback could excite the system toward pitch resonance, which would result in poor ride quality and stability over the corresponding speed or range of speeds where the pitch resonance is encountered.

Figure 2:
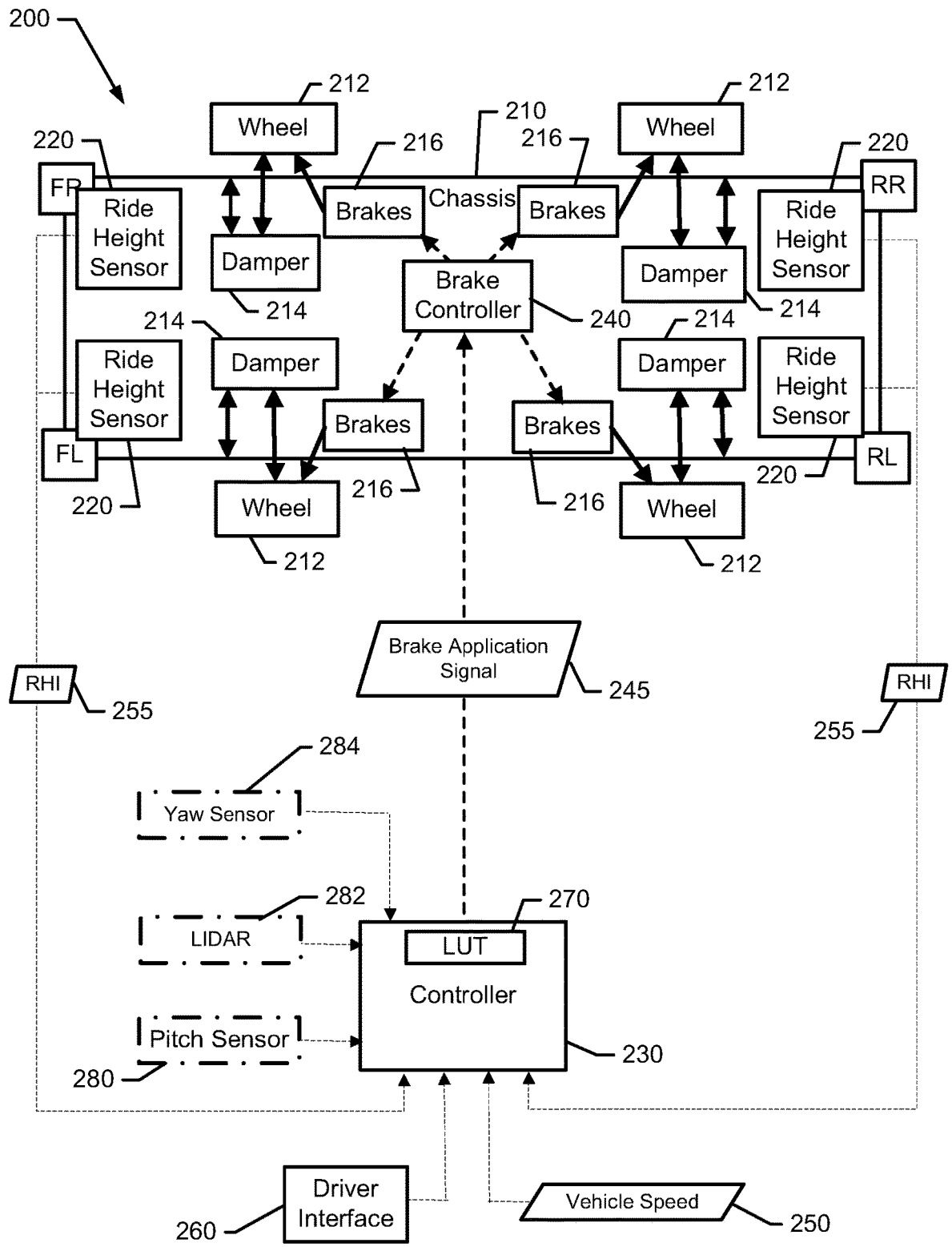
FIG. 2 illustrates a block diagram of an electronic pitch stability control system in accordance with an example embodiment.

To avoid pitch resonance, example embodiments may employ an electronic pitch control system 200. An example is shown in FIG. 2, which illustrates a block diagram of the electronic pitch control system 200. As shown in FIG. 2, a vehicle chassis 210 may be provided with wheels 212. The wheels 212, and corresponding instances of a damper 214 for each respective one of the wheels 212 may form part of a suspension system of the vehicle on which the electronic pitch control system 200 is deployed.

In an example embodiment, the electronic pitch control system 200 may include a ride height sensor 220 associated with each wheel 212 and damper 214. In this regard, an instance of the ride height sensor 220 may be provided in or near each corner of the chassis 210 (e.g., front-right (FR), front-left (FL), rear-right (RR) and rear-left (RL)). The ride height sensors 220 may be configured to determine a height of the chassis 210 (or another reference point on the vehicle) relative to the ground or a reference location that is generally assumed to correspond to the ground. The ride height sensors 220 may be embodied in any of a number of different ways including via the use of lasers or other optical sensing means. However, any suitable ride height sensor could be employed.

The ride height sensors 220 may be operably coupled to a controller 230, which may be an electronic control unit (ECU) of the vehicle, or a separate instance of processing circuitry comprising a processor and memory. The controller 230 may be configured (e.g., via hardware, software or a combination of hardware and software configuration or programming) to receive pitch information from the ride height sensors 220 (and sometimes also from other components) and strategically apply brake interventions to individual wheels 212 as described in greater detail below.

As shown in FIG. 2, each of the wheels 212 may have corresponding brakes 216 associated therewith. The brakes 216 may be friction brakes, regenerative brakes, or any other form of braking device, and may be operably coupled to a brake controller 240. The brake controller 240 and the brakes 216 may each be components or portions of a brake system of the vehicle and of the electronic pitch control system 200. The brake controller 240 may be configured to interface with the brakes 216 to provide braking signals for the application of braking forces by the brakes 216 at any or all of the individual instances of the brakes 216. In an example embodiment, the brake controller 240 may operate responsive to one or more triggers or initiating events. Although many different triggers or initiating events could activate the brake controller 240 to cause the brake controller to provide braking signals to the brakes 216, example embodiments provide that at least one such trigger or initiating event is receipt of a brake application signal 245 from the controller 230. In some cases, further post-processing of the data provided by the ride height sensors 220 (e.g., wheel vertical speed and wheel acceleration) may also be performed by the controller 230.

In an example embodiment, the brake application signal 245 may be generated by the controller 230 during vehicle pitch based on vehicle speed 250 and ride height information (RHI) 255 generated by the ride height sensors 220. Moreover, in some examples, the brake application signal 245 may be generated in a particular, driver-selected operational mode (e.g., an electronic pitch stability control (EPSC) mode. Thus, for example, a user interface (or driver interface 260) may be provided at the steering wheel, dashboard, center console, armrest or any other console or location conveniently accessible to the driver. The user interface may include a button, switch, lever, key (soft or hard) or other operable member that can be actuated to activate the controller in the EPSC mode. When the EPSC mode is activated, the controller 230 may be enabled to automatically monitor conditions to determine whether (and when) to apply the brake application signal 245 as described herein.

In an example embodiment, the controller 230 may be configured to execute a pitch control algorithm stored at or accessible to the controller 230. In this regard, for example, the controller 230 may be configured to receive the ride height information 255 from each of the ride height sensors 220 along with vehicle speed 250 and execute the pitch control algorithm based on such information. The pitch control algorithm may configure the controller 230 to determine whether and when to apply the brake application signal (on a wheel-by-wheel basis). In other words, the pitch control algorithm may include programming for determining, in real time or near real time, the conditions at each respective one of the wheels 212 in the context of the overall situation of the vehicle, and provide stability control inputs in the form of brake signals to the individual respective ones of the wheels 212 in order to maximize stability with respect to avoidance of pitch resonance. As such, the brake application signal 245 provided to the brake controller 240 may indicate which individual one of the wheels 212 is to have brake forces applied thereto by the respective instance of the brakes 216 that correspond to the individual one of the wheels 212. Moreover, each of these individual controls for the wheels 212 may be received simultaneously and may be the same or different from the controls prescribed for other wheels 212.

Figure 6:
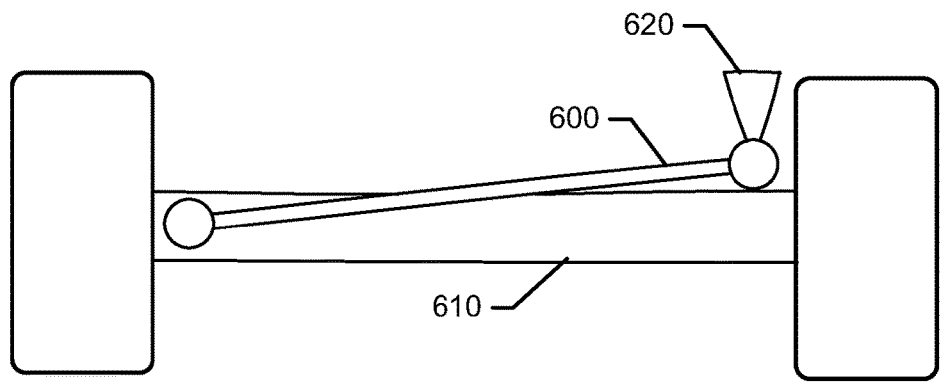
FIG. 6 illustrates a schematic view of a suspension system employing a panhard rod.
Figure 7:
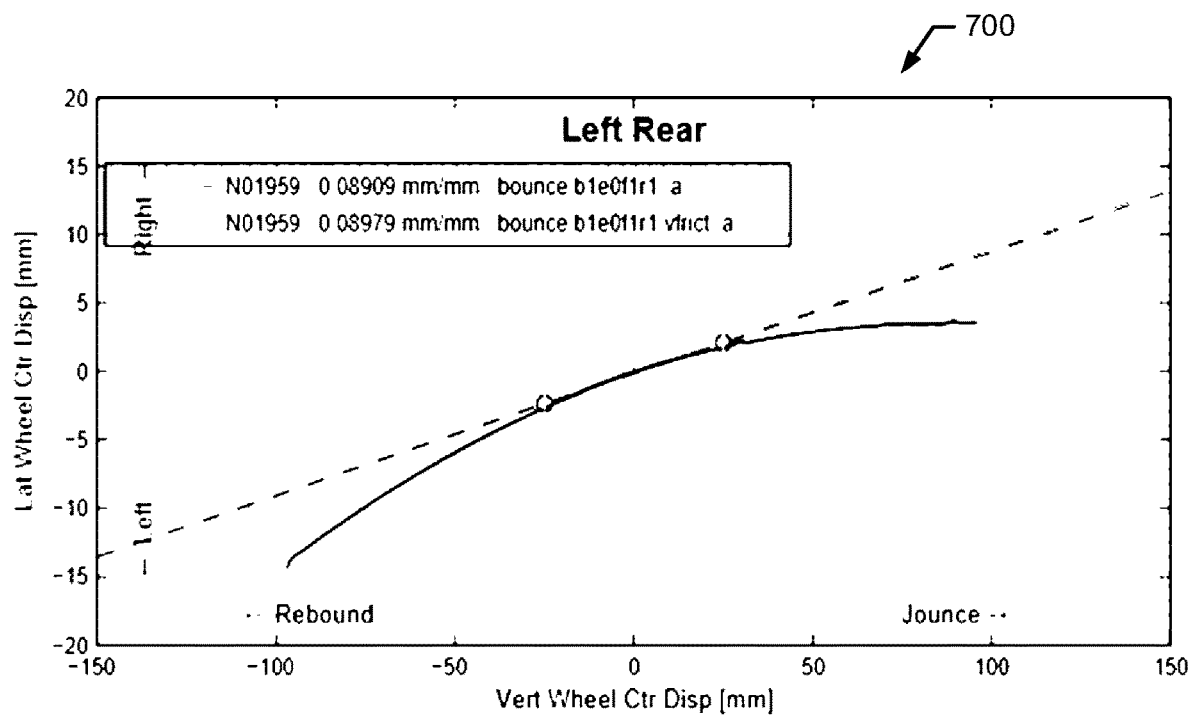
FIG. 7 illustrates a plot of lateral displacement of the wheel center versus vertical displacement of the wheel center for the panhard rod of FIG. 6 in accordance with an example embodiment.

Based on the ride height information, wheel speed and acceleration, the controller 230 may also be configured to make predictions regarding rebound positions and amount of time that a corresponding wheel may not be in contact with the road. The controller 230 may also be configured to take kinematic effects into consideration for the particular type of suspension system employed (e.g., lateral forcing due to a panhard rod 600 (see FIG. 6) coupling an axle 610 to a chassis 620 of a vehicle in either front suspension, rear suspension or both). For example, the yaw acceleration of the body caused by lateral forcing of the panhard rod 600, may be counter balanced by brake interventions that may be different left to right to stabilize the vehicle in yaw when pitch resonance occurs. FIG. 7 illustrates a plot 700 of lateral displacement of the wheel center versus vertical displacement of the wheel center for the panhard rod 600 of FIG. 6. Normal dynamic stability control (DSC) systems may be too slow to intervene when there is no contact between the wheel and road. However, the fact that the controller 230 may be configured to predict periods of no contact may create a significant advantage in terms of response time. Thus, for example, the controller 230 may perform an intervention based on a prediction regarding when a period of no contact between wheel and road may occur (e.g., ride height sensor jounce data may suggest that a wheel went so deep into a jounce bumper that rebound damping could not sufficient damp out the rebound motion and thereby cause the wheel to leave the road).

In an example embodiment, the controller 230 may include or otherwise have access to a lookup table (LUT) 270. The lookup table 270 may, for example, include speed values and ride height values for each of the wheels 212, and corresponding indications of whether to apply brake forces and perhaps also how much brake force to apply (e.g., via the brake application signal 245). Thus, for example, the lookup table 270 may be entered based on the ride height information 255 and the vehicle speed 250 to determine whether and when to generate the brake application signal 245 (and for which wheel(s) 212). In some examples, the controller 230 may be configured to examine phasing of pitch calculations made from ride height information 255 associated with the ride height sensors 220. Phasing of the pitch calculations versus the pitch from the vehicle may be calculated by the controller 230 in order to determine pitch resonance.

In some cases, the controller 230 may be configured to execute the pitch control algorithm on as little information as the vehicle speed 250 and the ride height information 255. However, in other cases, additional information may also be used to inform the controller 230 as to the current situation (from a pitch control stability perspective) to enable more informed or accurate decision making regarding the application of the brake application signal 245. For example, in some cases, a pitch sensor 280 may be provided. Although pitch information is certainly discernable from the ride height information 255, use of the pitch sensor 280 (e.g., a sensor such as a gyro specifically configured to detect vehicle rotation (i.e., pitch) about a transverse axis) may augment the ride height information 255 for this purpose by directly measuring pitch information. Pitch information may be used as a modifier to the output of the lookup table 270 or may be provided in a separate table to determine the modifier. The pitch sensor 280 may further enable direct sensing of whether the front or rear suspension is phasing in or out of phase with pitch motion. This additional information may further inform the controller 230 with regard to susceptibility to providing excitation toward resonance, and may be used to apply braking forces at specific stages of either or both compression and rebound as described herein.

In yet another example, a lidar detector 282 may be added for road surface detection or other terrain information. Information regarding the road surface or terrain on which the vehicle is operating may further be included in determinations made by the controller 230 with regard to determining whether and when to provide the brake application signal 245. In still other examples, a yaw sensor 284 may be added to detect yaw (i.e., rotation of the vehicle about a vertical axis). The existence (and degree) of yaw may impact stability of the vehicle, so by considering the generation of the brake application signal 245 also in light of the amount of yaw being experienced, individual wheels 212 may receive brake forces that may tend to counteract or reduce the amount of yaw being experienced by the vehicle.

Figure 3:
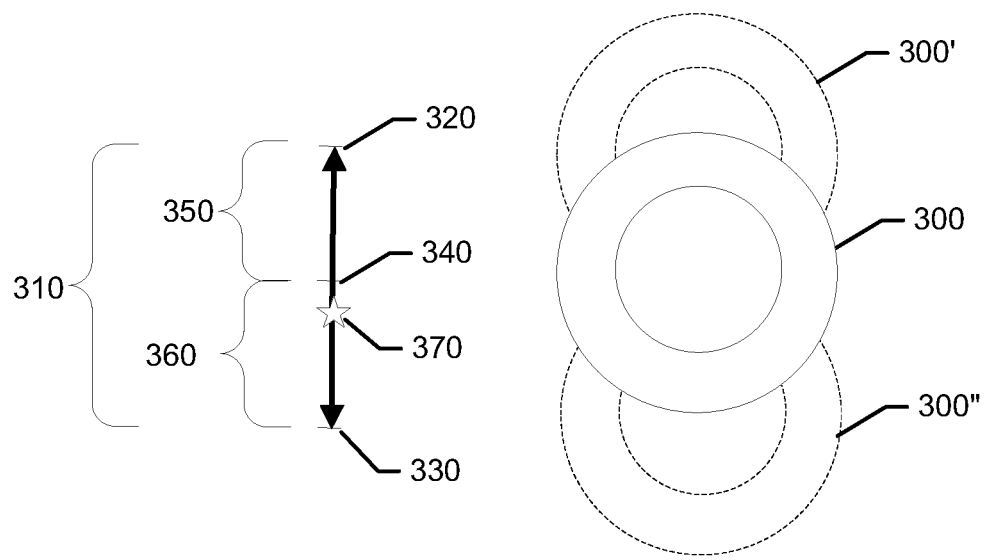
FIG. 3 illustrates a range of vehicle wheel absolute positions and certain reference points relative to the range in accordance with an example embodiment.

In some embodiments, as noted above, vehicle speed 250 and ride height information 255 may be used to enter the lookup table 270, or otherwise be used as the basis by which the controller 230 determines whether to generate the brake application signal 245 (and for what wheels 212). However, in some examples, the ride height information 255 may include, or be used to calculate or determine, certain other information that may be used as a basis for activity by the controller 230. For example, the ride height information 255 may include an indication of absolute position of a corresponding one of the individual wheels 212 relative to a range of travel of the wheel 212. In this regard, for example, FIG. 3 illustrates, in solid lines, a wheel 300 at a normal ride height. The same wheel at a positon of full compression 300' and at a position of full rebound 300" is also shown in dashed lines. Thus, a range of wheel travel 310 may be defined from max compression 320 to max rebound 330. A motion transition point 340 may also be defined to distinguish between a compression zone 350 (where the suspension system and damper of the wheel 300 is in compression) and a rebound zone 360 (where the suspension system and damper of the wheel is in rebound). The ride height information 255 may therefore show (instantaneously) the current ride height of the vehicle or the current absolute position 370 of the wheel 300 relative to the range of wheel travel 310. In other words, the ride height information 255 may indicate to the controller 230 exactly where each wheel currently is within its own range of motion and possible locations at any instant in time. The controller 230 may then be configured to generate the brake application signal 245 at strategic times (or locations) within either a compression cycle, a rebound cycle, or based on proximity to the motion transition point 340 or to either of the max compression 320 and max rebound 330 locations. This gives the controller 230 a unique ability to understand where each wheel is in relation to the ground and each other to apply braking forces to manage avoidance of pitch resonance and otherwise maximize pitch stability. For example, a wheel tending toward the location of max rebound 330 may have a braking force applied to tend the wheel instead toward compression and thereby counteract rebound forces that could possibly otherwise build to resonance at certain speeds where pitch resonance may otherwise be an issue.

The ride height information 255 may also or alternatively be useful for determining damper speed, damper acceleration, or where the damper piston is relative to the damper pistons full range of motion. Damper force and spring force may also be inferred based on ride height information 255, or may be measured and received from the dampers themselves. Regardless of how received and generated, information such as damper speed, damper acceleration, damper force or spring force may also be used in connection with entering a lookup table or modifying results of such use of a lookup table. Data relating to current absolute position 370, motion transfer point 340 (or proximity to either such points), damper speed, damper acceleration, spring force and/or damper force may therefore be used as bases for determining to initiate the brake application signal 245 to define the existence of braking force application, the amount of braking force application and/or the timing of braking force application.

As payload increases, pitch inertia also increases. Therefore, it may be advantageous to provide a capability to adjust suspension characteristics to match current payload status. In some examples, the controller 230 may be configured for applying strategic braking with the ability to account for payload. In such a system, the ride height sensors 220 may also provide information that is indicative of the current loading of the vehicle. Based on the current loading, the vehicle may already be closer to max compression 320, and the pitch characteristics may be altered accordingly. Thus, the pitch control algorithm may modify brake force application on a wheel-by-wheel basis in consideration of current vehicle loading conditions. In some cases, a separate instance of lookup table may be provided for each of a number of different ranges of loading conditions from no load to full load.

Figure 4:
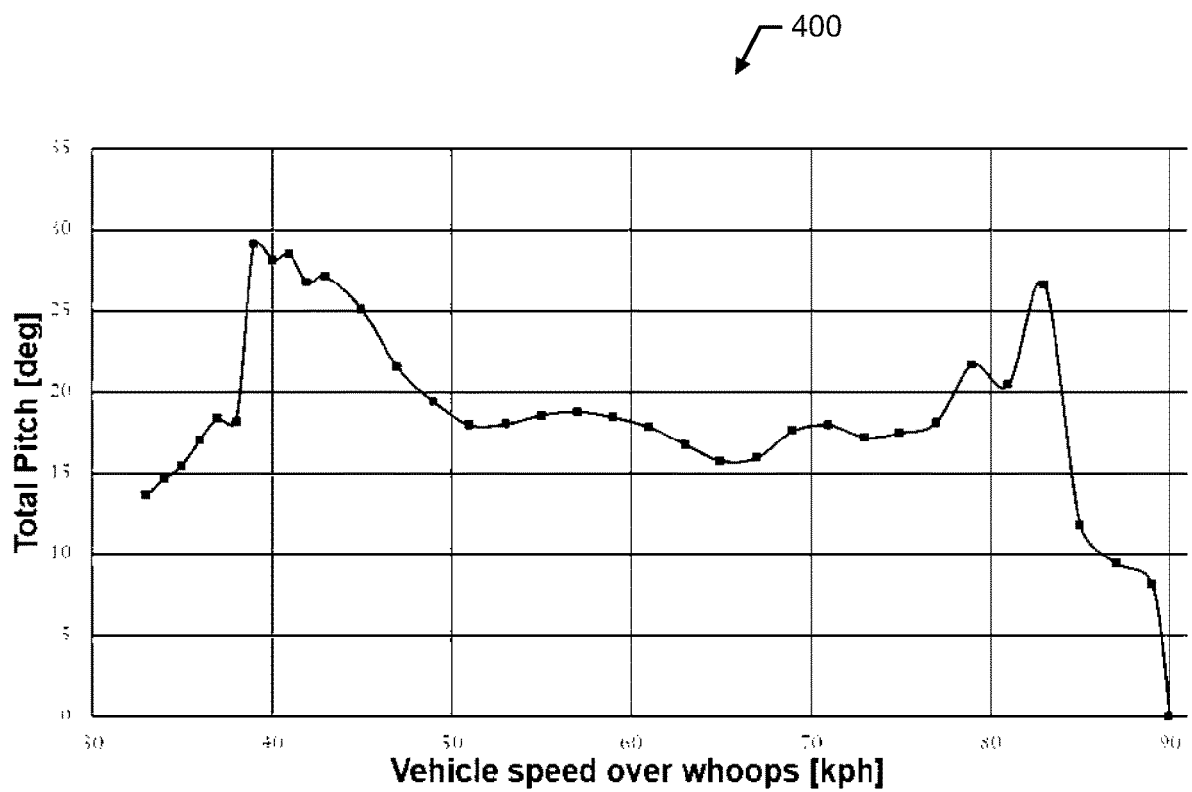
FIG. 4 illustrates a graph of pitch versus vehicle speed in accordance with an example embodiment.
Figure 5:
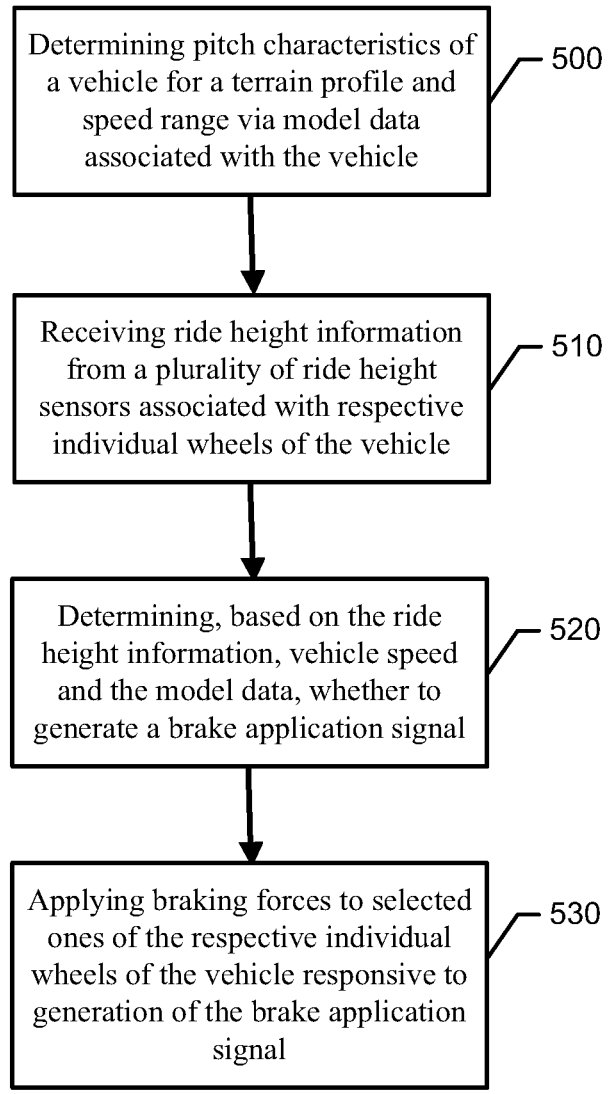
FIG. 5 is a block diagram of a method of automatically applying electronic pitch stability control for a suspension system of a vehicle in accordance with an example embodiment.

FIG. 4 illustrates a plot 400 of total pitch versus vehicle speed for a hypothetical vehicle. Thus, FIG. 4 may be understood to be modeled data generated for the hypothetical vehicle. As shown in FIG. 4, total pitch reaches maximum levels at around 40 kph and just over 80 kph. In some example embodiments, the brake application signal 245 may be used to simply reduce vehicle speed to avoid pitch resonance (or reaching an area of high total pitch). For example, the controller 230 may be aware that vehicle speed is increasing toward 40 kph and that, for the current conditions and/or vehicle, operation at 40 kph may cause pitch levels to rapidly increase. The controller 230 may therefore apply braking forces (via the brake application signal 245 to the wheels 212 of the vehicle to reduce speed (e.g., by 3 kph) or maintain speed below a threshold value (e.g., 38 kph) that avoids the high pitch area. However, as noted above, finer details regard application of braking on individual wheels based on individualized information associated with the current pitch (or yaw) situation that is being experienced by the vehicle may also be employed.

The modeled data of FIG. 4 may be used in connection with the operation of the controller 230 as described above. In this regard, for example, the controller 230 may include the modeled data (or the lookup table 270 or other information used by the controller 230 may find its basis at least in part in the modeled data for the vehicle). The controller 230 may therefore be configured to execute a method of automatically applying electronic pitch stability control for a suspension system. The method may include determining pitch characteristics of a vehicle for a terrain profile and speed range via model data associated with the vehicle at operation 500 and receiving ride height information from a plurality of ride height sensors associated with respective individual wheels of the vehicle at operation 510. The method may further include determining, based on the ride height information, vehicle speed and the model data, whether to generate a brake application signal at operation 520, and applying braking forces to selected ones of the respective individual wheels of the vehicle responsive to generation of the brake application signal at operation 525.

The method of some embodiments may include additional steps, modifications, augmentations and/or the like to achieve further objectives or enhance performance of the method. The additional steps, modifications, augmentations and/or the like may be added in any combination with each other. Below is a list of various additional steps, modifications, and augmentations that can each be added individually or in any combination with each other. For example, receiving the ride height information may include receiving an indication of absolute position of a corresponding one of the individual wheels relative to a range of travel between maximum compression and maximum rebound positions, and determining whether to generate the brake application signal may include determining whether to generate the brake application signal based on proximity to the absolute position of the corresponding one of the individual wheels. Additionally or alternatively, receiving the ride height information may include receiving an indication of a motion transition point defining a change from rebound to compression, or defining a point of maximum compression or maximum rebound, and determining whether to generate the brake application signal may include determining whether to generate the brake application signal based on the proximity to the motion transition point or the point of maximum compression or maximum rebound. Additionally or alternatively, receiving the ride height information may include receiving an indication of damper speed or damper acceleration, and determining whether to generate the brake application signal may include determining whether to generate the brake application signal based on the damper speed or the damper acceleration. Additionally or alternatively, receiving the ride height information may include receiving an indication of spring force or damper force, and determining whether to generate the brake application signal may include determining whether to generate the brake application signal based on the spring force or damper force. In an example embodiment, applying the brake forces may include generating a brake application signal on a wheel-by-wheel basis based on values defined in a lookup table for the ride height information associated with each respective one of the wheels at respective given vehicle speeds.

Example embodiments may provide improved pitch control and enable higher speeds over whoops while enjoying improved comfort and a greater confidence in the feel of the ride. Example embodiments may also provide improved yaw stability and avoidance of coming into proximity of conditions where pitch resonance may be reached. Moreover, in certain modes that may be selectable by the operator (e.g., an electronic pitch stability control mode, the method above may be automatically executed without further input or interaction from the driver.

A vehicle control system for improving pitch stability of a vehicle may therefore be provided. The vehicle control system includes a plurality of ride height sensors, a brake system and a controller. The ride height sensors may determine ride height information associated with individual wheels of a vehicle. The brake system may apply braking force to the individual wheels of the vehicle responsive to provision of a brake application signal. The controller may generate (e.g., by being configured accordingly) the brake application signal during vehicle pitch based on vehicle speed and the ride height information.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the ride height information may include an indication of absolute position of a corresponding one of the individual wheels relative to a range of travel between maximum compression and maximum rebound positions. In an example embodiment, the controller may be configured to provide the brake application signal based on proximity to the absolute position of the corresponding one of the individual wheels. In some cases, the ride height information may include an indication of motion transition point defining a change from rebound to compression, or defining a point of maximum compression or maximum rebound. In an example embodiment, the controller may be configured to provide the brake application signal based on proximity to the motion transition point. In some cases the ride height information may include an indication of damper speed or damper acceleration. In an example embodiment, the controller may be configured to provide the brake application signal based on the damper speed or the damper acceleration. In some cases, the ride height information may include an indication of spring force or damper force. In an example embodiment, the controller may be configured to provide the brake application signal based on the spring force or damper force. In some cases, the controller may include processing circuitry including a processor and memory. The memory may store a lookup table, and the brake application signal may be generated on a wheel-by-wheel basis based on values defined in the lookup table for the ride height information associated with each respective one of the wheels at respective given vehicle speeds. In an example embodiment, the may be is further configured to receive yaw information, and the brake application signal may be generated based on the yaw information. In some cases, the controller may be further configured to terrain information from a lidar sensor, and the brake application signal may be generated based on the terrain information. In an example embodiment, a pitch sensor may be operably coupled to the controller to provide pitch information to the controller, and the brake application signal may be generated based on the pitch information. In some cases, the controller may be operable responsive to activation of an electronic pitch stability control mode at a driver interface, and wherein the brake application signal is provided automatically and without driver input when the electronic pitch stability control mode is activated.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle control system comprising:
a plurality of ride height sensors that determine ride height information associated with individual wheels of a vehicle;
a brake system that applies braking force to the individual wheels of the vehicle responsive to provision of a brake application signal; and
a controller that generates the brake application signal during vehicle pitch based on vehicle speed and the ride height information.

2. The system of claim 1, wherein the ride height information comprises an indication of absolute position of a corresponding one of the individual wheels relative to a range of travel between maximum compression and maximum rebound positions.

3. The system of claim 2, wherein the controller is configured to provide the brake application signal based on a position of the corresponding one of the individual wheels relative to the absolute position of the corresponding one of the individual wheels.

4. The system of claim 1, wherein the ride height information comprises an indication of a motion transition point defining a change from rebound to compression, or defining a point of maximum compression or maximum rebound.

5. The system of claim 4, wherein the controller is configured to provide the brake application signal based on a position of a corresponding one of the individual wheels relative to the motion transition point.

6. The system of claim 1, wherein the ride height information comprises an indication of damper speed or damper acceleration.

7. The system of claim 6, wherein the controller is configured to provide the brake application signal based on the damper speed or the damper acceleration.

8. The system of claim 1, wherein the ride height information comprises an indication of spring force or damper force.

9. The system of claim 8, wherein the controller is configured to provide the brake application signal based on the spring force or damper force.

10. The system of claim 1, wherein the controller comprises processing circuitry including a processor and memory, the memory storing a lookup table,
wherein the lookup-table includes speed values, ride height values, and corresponding braking force values and time for the braking force to be applied, and
wherein the brake application signal is generated on a wheel-by-wheel basis based on values defined in the lookup table for the ride height information associated with each respective one of the wheels at respective given vehicle speeds.

11. The system of claim 10, wherein the controller is further configured to receive yaw information; and wherein the brake application signal is generated based on the yaw information.

12. The system of claim 10, wherein the controller is further configured to terrain information from a lidar sensor, and
wherein the brake application signal is generated based on the terrain information.

13. The system of claim 10, wherein a pitch sensor is operably coupled to the controller to provide pitch information to the controller, and
wherein the brake application signal is generated based on the pitch information.

14. The system of claim 10, wherein the controller is operable responsive to activation of an electronic pitch stability control mode at a driver interface, and wherein the brake application signal is provided automatically and without driver input when the electronic pitch stability control mode is activated.

15. A method of automatically applying electronic pitch stability control for a suspension system, the method comprising:
determining pitch characteristics of a vehicle for a terrain profile and speed range via a lookup table associated with the vehicle;
receiving ride height information from a plurality of ride height sensors associated with respective individual wheels of the vehicle;
determining, based on the ride height information, vehicle speed and the lookup table, whether to generate a brake application signal; and
applying braking forces to selected ones of the respective individual wheels of the vehicle responsive to generation of the brake application signal,
wherein the lookup table includes speed values, ride height values, and corresponding braking force values and time for the braking forces to be applied.

16. The method of claim 15, wherein receiving the ride height information comprises receiving an indication of absolute position of a corresponding one of the individual wheels relative to a range of travel between maximum compression and maximum rebound positions, and determining whether to generate the brake application signal comprises determining whether to generate the brake application signal based on a position of a corresponding one of the individual wheels relative to the absolute position of the corresponding one of the individual wheels.

17. The method of claim 15, wherein receiving the ride height information comprises receiving an indication of a motion transition point defining a change from rebound to compression, or defining a point of maximum compression or maximum rebound, and determining whether to generate the brake application signal comprises determining whether to generate the brake application signal based on a position of a corresponding one of the individual wheels relative to the motion transition point or the point of maximum compression or maximum rebound.

18. The method of claim 15, wherein receiving the ride height information comprises receiving an indication of damper speed or damper acceleration, and determining whether to generate the brake application signal comprises determining whether to generate the brake application signal based on the damper speed or the damper acceleration.

19. The method of claim 15, wherein receiving the ride height information comprises receiving an indication of spring force or damper force, and determining whether to generate the brake application signal comprises determining whether to generate the brake application signal based on the spring force or damper force.

20. The method of claim 15, wherein applying the brake forces comprises generating a brake application signal on a wheel-by-wheel basis based on values defined in the lookup table for the ride height information associated with each respective one of the wheels at respective given vehicle speeds.

* * * * *